(12) United States Patent
Snyder et al.

(10) Patent No.: US 11,040,652 B2
(45) Date of Patent: Jun. 22, 2021

(54) ILLUMINATING EMBLEM DEVICE AND METHODS OF MANUFACTURE AND USE

(71) Applicant: Sharpline Converting Inc., Encinitas, CA (US)

(72) Inventors: Eric Snyder, Wichita, KS (US); Daniel Kincade, Encinitas, CA (US); Rogelio Daniel Fernandez Rios, Wichita, KS (US)

(73) Assignee: Sharpline Converting Inc., Wichita, KS (US)

( * ) Notice: Subject to any disclaimer, the term of this patent is extended or adjusted under 35 U.S.C. 154(b) by 0 days.

(21) Appl. No.: 16/686,025

(22) Filed: Nov. 15, 2019

(65) Prior Publication Data

US 2020/0079283 A1 Mar. 12, 2020

Related U.S. Application Data

(63) Continuation of application No. 15/656,400, filed on Jul. 21, 2017, now abandoned.

(60) Provisional application No. 62/365,050, filed on Jul. 21, 2016.

(51) Int. Cl.
*B60Q 1/56* (2006.01)
*F21V 8/00* (2006.01)
*B60R 13/00* (2006.01)

(52) U.S. Cl.
CPC ............. *B60Q 1/56* (2013.01); *B60R 13/005* (2013.01); *G02B 6/0036* (2013.01); *G02B 6/0043* (2013.01); *G02B 6/0085* (2013.01); *G02B 6/0088* (2013.01); *G02B 6/0096* (2013.01); *G02B 6/0028* (2013.01); *G02B 6/0083* (2013.01)

(58) Field of Classification Search
CPC ...... B60Q 1/56; B60R 13/005; G02B 6/0036; G02B 6/0043; G02B 6/0085; G02B 6/0088; G02B 6/0096; G02B 6/0028; G02B 6/0083
USPC .................................................. 362/23.09
See application file for complete search history.

(56) References Cited

U.S. PATENT DOCUMENTS

| | | | |
|---|---|---|---|
| 6,190,026 B1 * | 2/2001 | Moore | B60Q 1/50 362/459 |
| 7,845,836 B2 * | 12/2010 | Okuda | B60R 13/02 362/488 |
| 2011/0286202 A1 * | 11/2011 | Kim | G02B 6/0061 362/97.1 |
| 2013/0242604 A1 * | 9/2013 | Kim | G02B 6/0021 362/606 |

(Continued)

*Primary Examiner* — Andrew J Coughlin
*Assistant Examiner* — Jessica M Apenteng
(74) *Attorney, Agent, or Firm* — Mintz Levin Cohn Ferris Glovsky and Popeo, P.C.

(57) ABSTRACT

Described herein includes embodiments of an illuminating emblem device that is configured to be coupled to a vehicle and/or device. Some implementations of the illuminating emblem device include a light assembly that is configured to provide a uniform (or substantially uniform) distribution of light along a front housing part or front panel of the illuminating emblem. For example, in some implementations, the illuminating emblem device can include a light diffusing filler that diffuses light emitted from the light assembly to assist with uniformly distributing light emitted through the front housing part. Various other embodiments of the illuminating emblem device and associated methods of manufacturing are described.

21 Claims, 17 Drawing Sheets

(56) References Cited

U.S. PATENT DOCUMENTS

| | | | | |
|---|---|---|---|---|
| 2013/0293098 A1* | 11/2013 | Li | ............................. | F21V 3/02 |
| | | | | 313/512 |
| 2014/0133128 A1* | 5/2014 | Oh | .......................... | G09F 13/08 |
| | | | | 362/84 |
| 2014/0247614 A1* | 9/2014 | Roberts | ................ | B60Q 1/2615 |
| | | | | 362/509 |
| 2014/0362570 A1* | 12/2014 | Miyoshi | .................... | F21K 9/68 |
| | | | | 362/240 |
| 2017/0101047 A1* | 4/2017 | Dellock | ............... | B60Q 1/2603 |

* cited by examiner

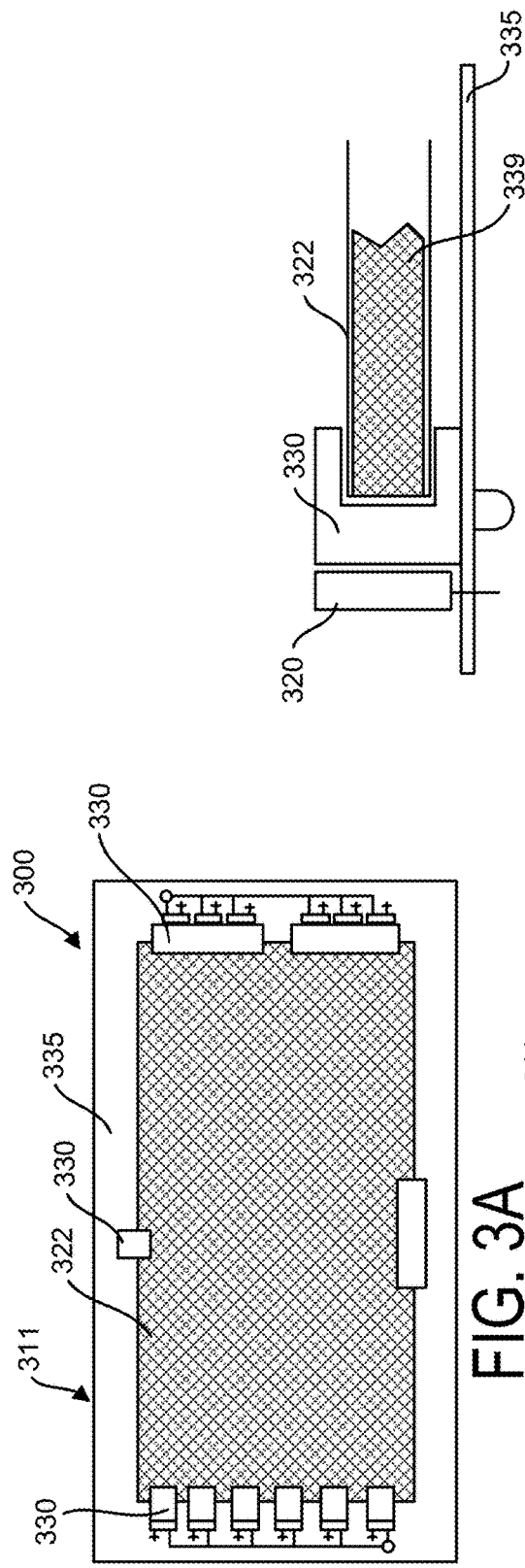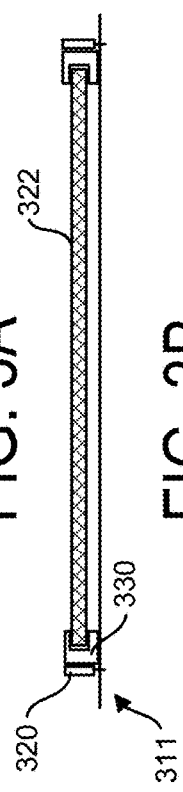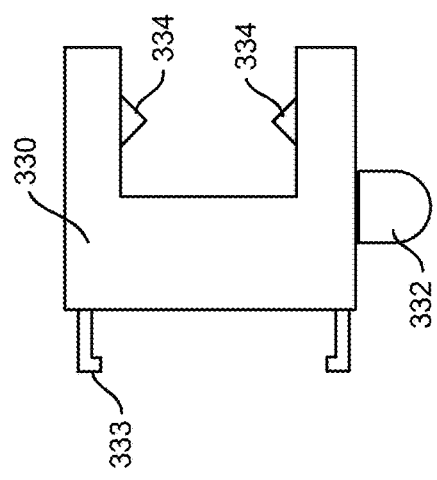
FIG. 3A
FIG. 3B
FIG. 3C
FIG. 3D

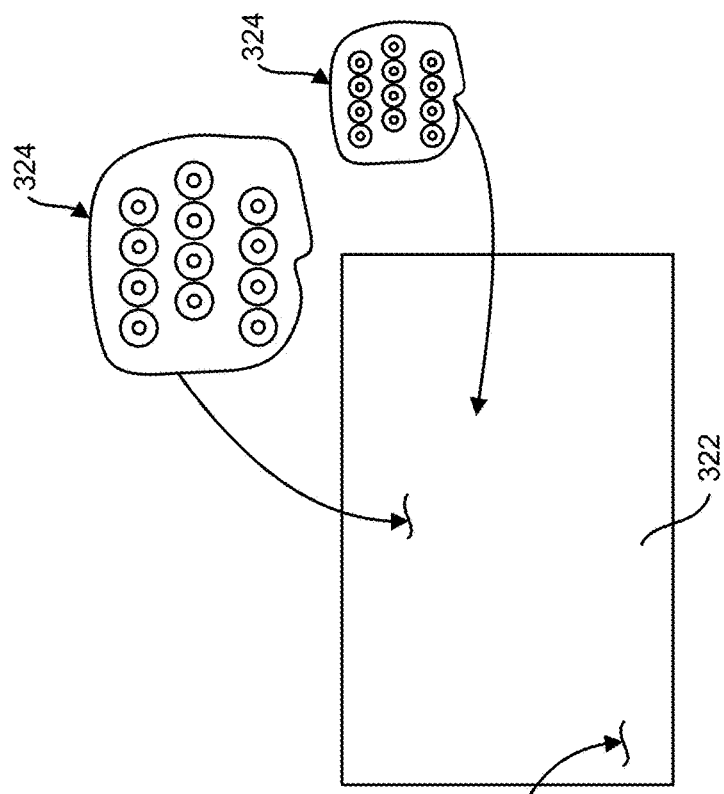
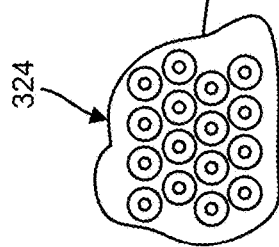
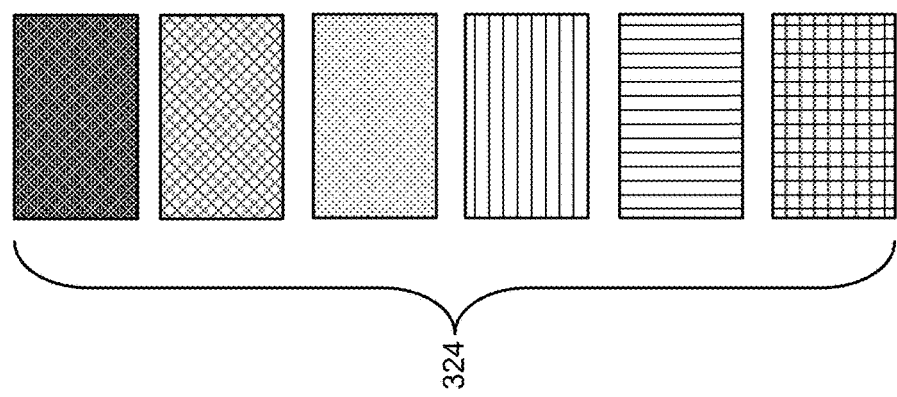
FIG. 3E

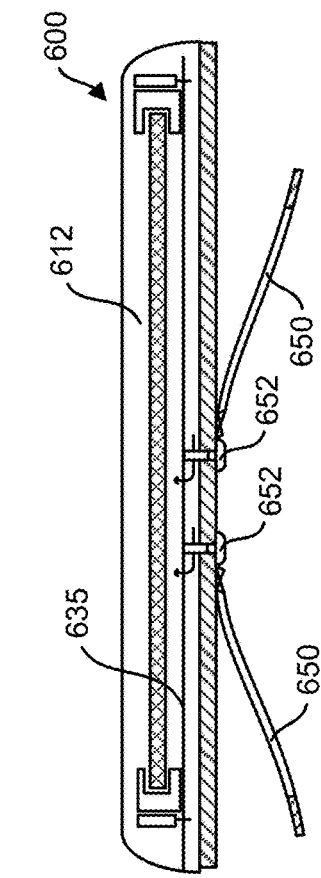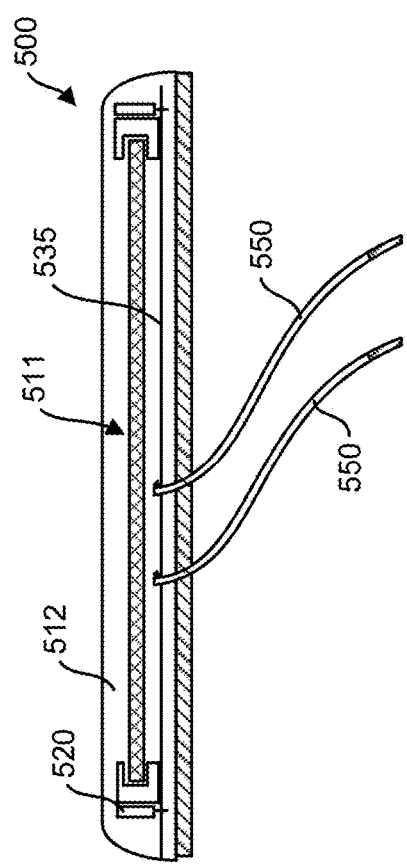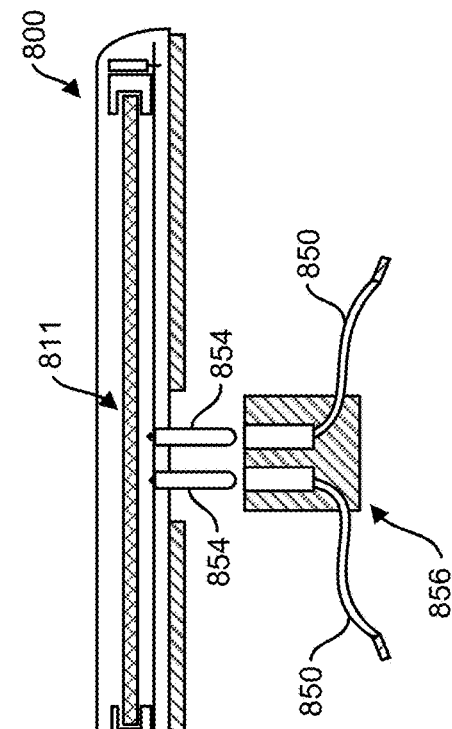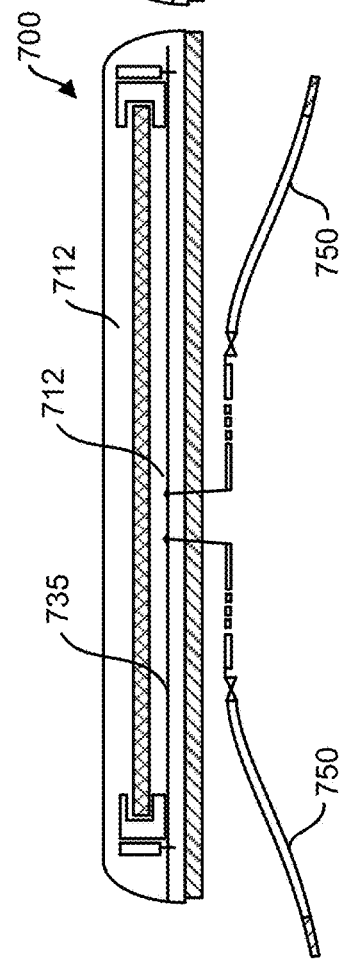

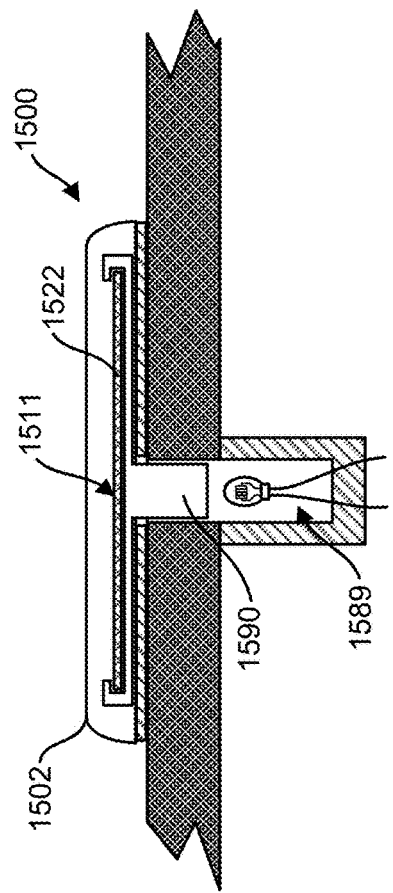
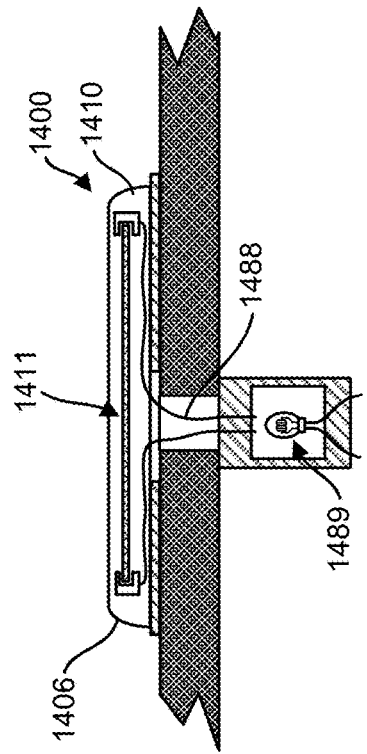
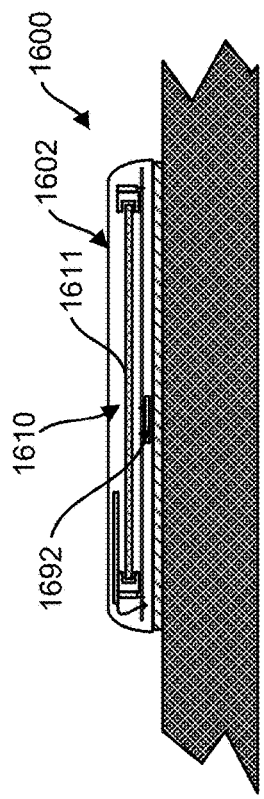

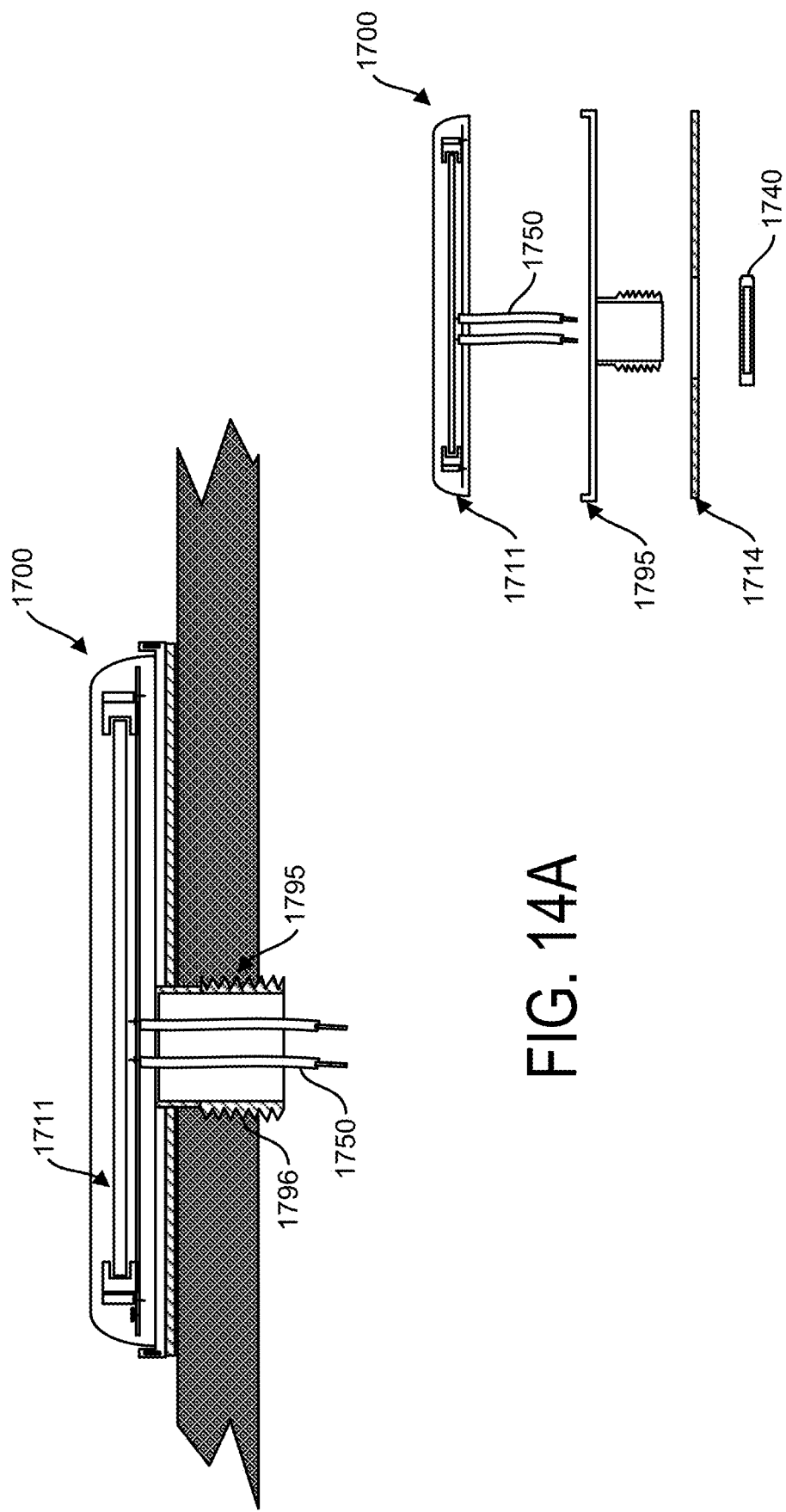

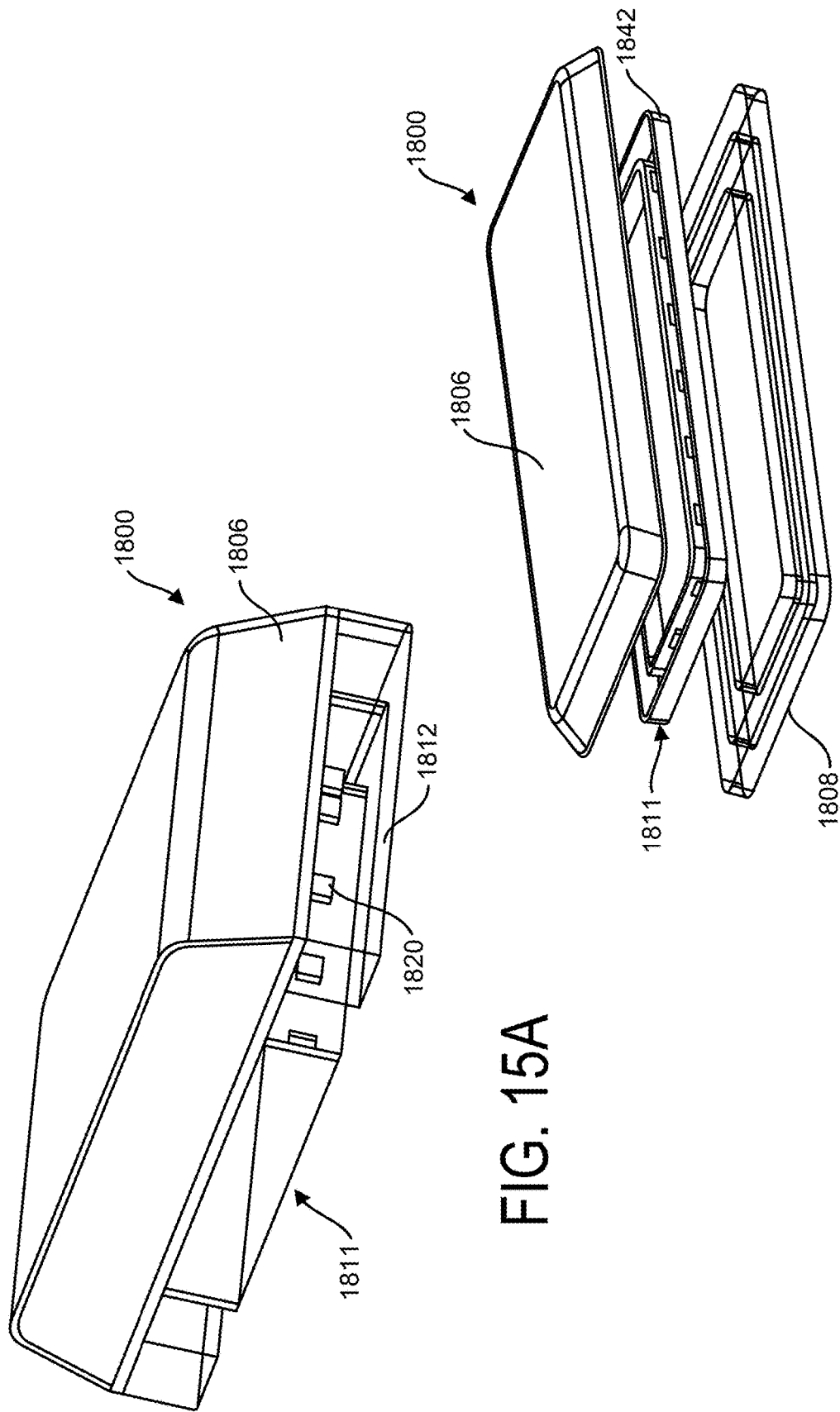

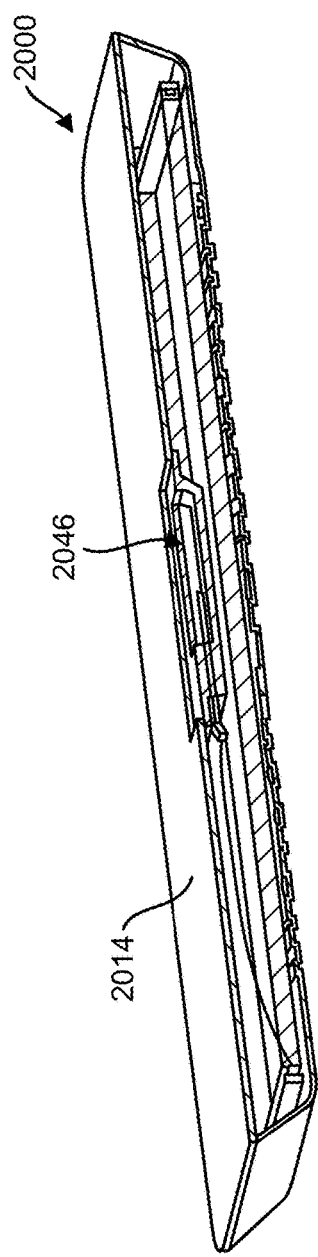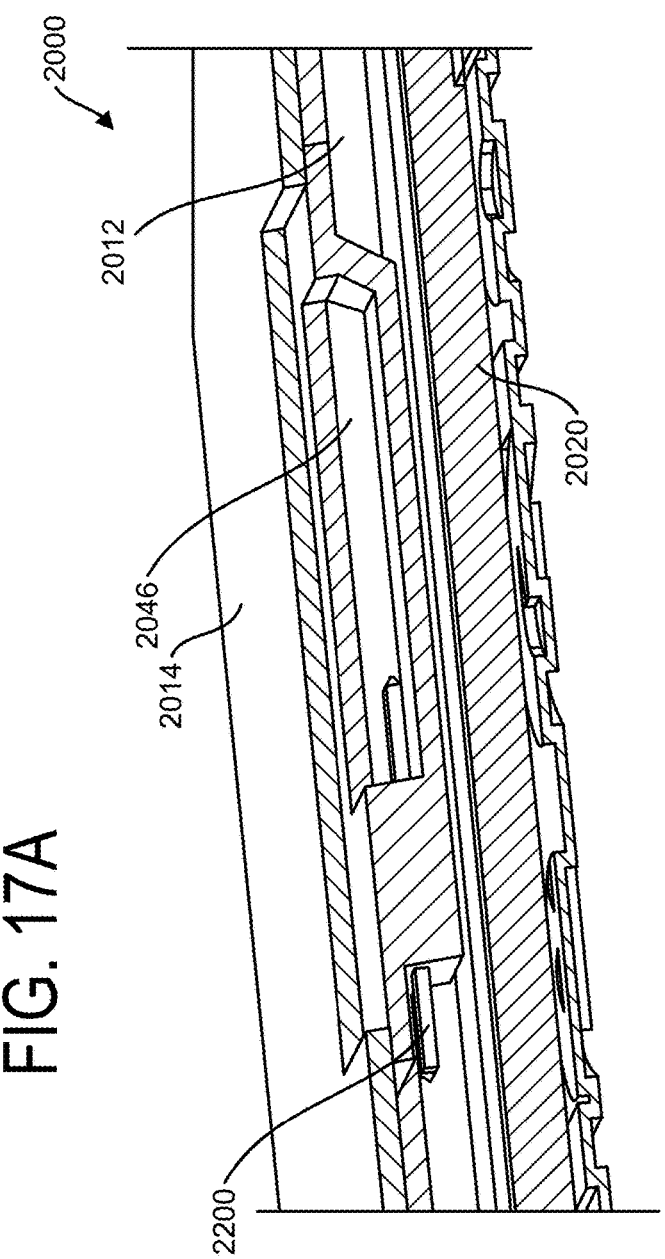
FIG. 17A
FIG. 17B

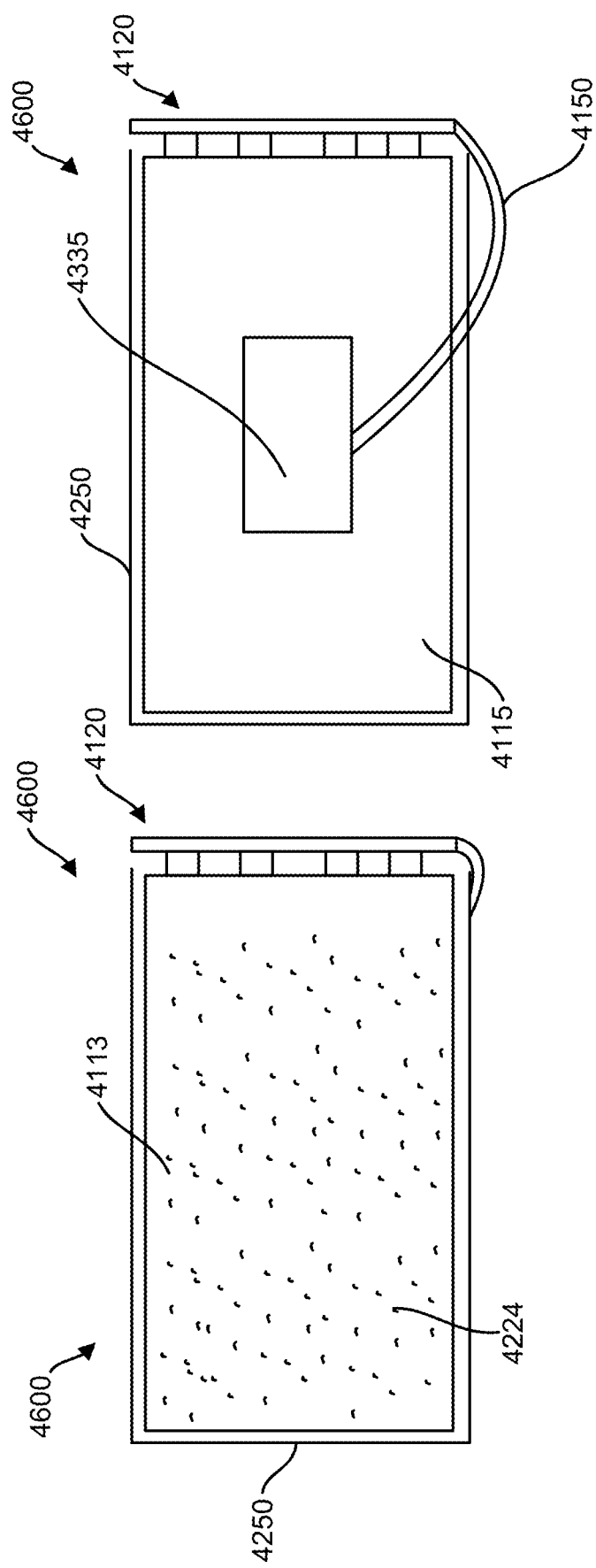

ILLUMINATING EMBLEM DEVICE AND METHODS OF MANUFACTURE AND USE

CROSS-REFERENCE TO RELATED APPLICATIONS

The current application is a continuation under 35 U.S.C. § 120 of U.S. patent application Ser. No. 15/656,400, filed on Jul. 21, 2017 and entitled "Illuminating Emblem Device And Methods Of Manufacture And Use," which claims priority under 35 U.S.C. § 119(e) to U.S. Provisional Application No. 62/365,050 filed Jul. 21, 2016, each of which are incorporated by reference herein in their entirety.

TECHNICAL FIELD

The subject matter described herein relates to various embodiments of an illuminating emblem device, as well as methods of use and manufacturing of same.

BACKGROUND

Nameplates or emblems have been made to identify various devices, such as vehicles, for decades. Through the years, various methods have been implemented to make such emblems. For example, one method includes die-casting metal that is polished and/or plated to produce a high-polished chrome emblem. Another method includes molding plastic and metal plating the outer surface of the molded plastic. Several emblems are made to appear 3-dimensional (3D) with a metal coating.

Vehicle manufacturers typically attach at least one emblem to each vehicle (e.g., car, motorcycle, truck, etc.) to identify a variety of aspects related to each vehicle, such as the make and model of the vehicle. Some emblems can add to the aesthetics of a vehicle and can be configured in any number of shapes, sizes, and colors. Emblems have also been used to identify various other manufactured products, such as household durable goods (refrigerators, stoves, washing machines, etc.) and recreational products (RV's, boats, motorcycles, skis, scooters, etc.).

A shortcoming of emblems can include their lack of visibility at night and during low light conditions. Attempts to improve emblem visibility in dark or low-light conditions have resulted in less than desirable results. Such attempts include, for example, the use of an outside light source directed onto the emblem. However, such approaches have shortcomings. These shortcomings can include an aesthetically unpleasant appearance, insufficient and/or non-uniform lighting, easily damaged, and expensive to install and manufacture. Other shortcoming can include excessive heat from an illumination source that can damage the emblem and/or surrounding structure, not achieving weather tight protection for electrics, and/or high costs. Accordingly, a need exists for improved illuminating emblems.

SUMMARY

Aspects of the current subject matter include various embodiments of an illuminating emblem assembly. In one aspect, an emblem assembly includes a housing having a front housing part coupled to a back housing part and an inner cavity contained between the front housing part and back housing part. The emblem assembly can include a light assembly configured to emit light and positioned within the inner cavity. The emblem assembly can further include a light diffusing filler within the inner cavity and positioned adjacent the light assembly to diffuse at least some of the light emitted from the light assembly, wherein at least a part of the front housing part allows the diffused light emitted from the light assembly to pass therethrough.

In some variations, one or more of the following features can optionally be included in any feasible combination. The light assembly can include at least one light emitting component coupled to a light panel, and the light panel can be configured to deflect light emitted from the at least one light emitting component towards the front housing part and uniformly distribute the emitted light through the front housing part. For example, the light emitting component can include one or more of a light emitting diode (LED), a pinpoint LED lamp, an incandescent light bulb, and a flexible light source. The light panel can include at least one panel feature, such as a surface feature, and each panel feature can, for example, direct the deflected light towards the front housing part. The at least one panel feature can include one or more of a printed pattern, a machined pattern, a molded pattern, a lens, a frosted coating, and a semi-transparent coating positioned along a surface of the light panel. The at least one panel feature can include a plurality of extrusions, and each of the plurality of extrusions can include one or more of a sphere shape, a half-sphere shape, and a tubular shape. However, other shapes of the extrusions are within the scope of this disclosure.

In some embodiments, the front housing part can include a vacuum deposition material that allows light to transmit therethrough thereby illuminating the front housing part when the light assembly is emitting light and creates a metal, metallic, or chrome appearance to the front housing part when the light assembly is not emitting light. In some aspects, the front housing part can be three-dimensional. A front side of the back housing part can include one or more of a reflective film, a reflective tape, a reflective paint, a self-illuminating (e.g., fluorescent) paint, and a light diffusing surface. A first part of the front housing part can allow light to pass therethrough and a second part of the front housing part can prevent light from passing therethrough. The back housing part can include an adhesive positioned along a back side of the back housing part. An electrical lead can extend from the light assembly, such as through the back housing part, for connecting the light assembly to a power source.

In some embodiments, the light diffusing filler can include a colored pigment. The light diffusing filler can be made out of one or more of a plastic, a urethane, a silicone, an epoxy, a one part curing resin, and a two part curing resin. The light diffusing filler can include a material that dissipates heat from the emblem assembly. The light diffusing filler can include a fluorescent dye that becomes illuminated when light is emitted from the light assembly or from a secondary light source that is separate from the emblem assembly.

In some embodiments, the light assembly can include an LED light pipe. In some aspects, the light assembly can include an electroluminescent light panel or electroluminescent wire.

In some embodiments, the emblem assembly includes a printed circuit board (PCB) and an adapter. The adapter can couple a part of the light assembly to the PCB. The adapter can include one or more of a lens, a light diffusing surface finish, a light directing pattern, and a light coloring element.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A illustrates a top view of a light assembly of an embodiment of the illuminating emblem assembly;

FIG. 3B illustrates a side view of the light assembly of FIG. 3A;

FIG. 3C illustrates a partial side view of the light assembly of FIG. 3B;

FIG. 3D illustrates a side view of the adapter of FIG. 3B;

FIG. 3E illustrates various embodiments of surface features that can be positioned along one or more sides of a light panel of the light assembly of FIG. 3A, including various patterns and shapes of the surface features;

FIG. 5A illustrates a side cross-section view of another embodiment of the illuminating emblem assembly having distal ends of electrical leads encapsulated in a filler material;

FIG. 5B illustrates a side cross-section view of another embodiment of the illuminating emblem assembly having electrical leads coupled to subsurface conductive pads;

FIG. 5C illustrates a side cross-section view of another embodiment of the illuminating emblem assembly having electrical leads coupled to conductive tabs that are exposed through encapsulation by a fill material;

FIG. 5D illustrates a side cross-section view of another embodiment of the illuminating emblem assembly having conductive pins extending from the light assembly that are configured to couple to a socket assembly;

FIG. 11 illustrates a side cross-section view of another embodiment of the illuminating emblem assembly including fiber optic cables exposed through fill material and illuminated by an external light source;

FIG. 12 illustrates a side cross-section view of another embodiment of the illuminating emblem assembly including a light pipe exposed through fill material to an external light source;

FIG. 13 illustrates a side cross-section view of another embodiment of the illuminating emblem assembly including an encapsulated photovoltaic cell;

FIG. 14A illustrates a side cross-section view of another embodiment of the illuminating emblem assembly including a backing feature with a bulkhead connection;

FIG. 14B illustrates an exploded side view of the illuminating emblem assembly of FIG. 14A;

FIG. 15A illustrates a perspective view of a downlight illuminating emblem assembly that includes a back housing part configured to block light being radiated in one or more directions;

FIG. 15B illustrates a partially exploded view of the downlight illuminating emblem assembly of FIG. 15A;

FIG. 17A illustrates a side cross-section view of an illuminating emblem assembly having a submerged bulkhead connector;

FIG. 17B illustrates a partial section view of the illuminating emblem assembly of FIG. 17A;

FIG. 19A illustrates a bottom view of another embodiment of a light assembly of an illuminating emblem assembly;

FIG. 19B illustrates another bottom view of the light assembly of FIG. 19A;

When practical, similar reference numbers denote similar structures, features, or elements.

DETAILED DESCRIPTION

Figure 1:
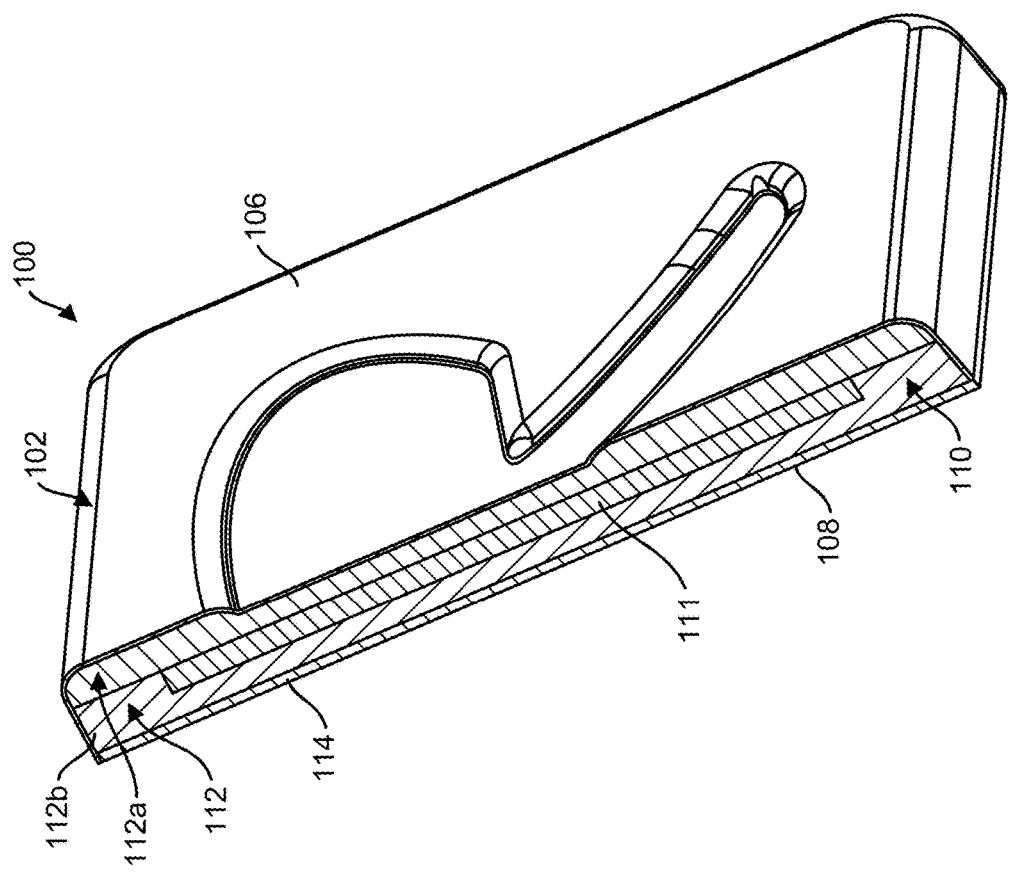
FIG. 1 illustrates a perspective cross-section view of an embodiment of an illuminating emblem assembly consistent with implementations of the current subject matter.

Described herein includes various embodiments of an illuminating emblem device that is configured to be coupled to a vehicle and/or device. Some implementations of the illuminating emblem device include a light assembly that is configured to provide a uniform (or substantially uniform) distribution of light along a front housing part or front panel of the illuminating emblem. For example, in some implementations, the illuminating emblem device can include a light diffusing filler that diffuses light emitted from the light assembly to assist with uniformly distributing light emitted through the front housing part. The light diffusing filler can also serve to obscure aesthetically unpleasing features positioned behind or within the light diffusing filler. Such uniform distribution of light can provide an improved appearance of features associated with the illuminating emblem, as well as allow the illuminating emblem to be easily seen in dark and low-light conditions. Some embodiments of the illuminating emblem device described herein includes a light or light assembly that does not provide uniform or substantially uniform light distribution, such as to achieve particular aesthetics.

Some illuminating emblem devices described herein can be self-contained such that a light source of the light assembly is contained within a housing of the illuminating emblem device, while also maintaining a low profile. In addition, the illuminating emblem device can include a self-contained and sealed light source that allows the illuminating emblem device to be water resistant or water proof. In addition to improved visibility and function, the illuminating emblem devices described herein can lower installation cost and maintenance, such as due to having a compact and sealed design. In some embodiments, the illuminating emblem device can include coupling features that assist with coupling the illuminating emblem device to a variety of surfaces, vehicles and devices.

In some embodiments, the illuminating emblem device can include various electronic configurations that are durable and low profile, as well as allow for efficient coupling of the illuminating emblem device to a power source. For example, various electrical connections between the light assembly and a power source are described herein. Such connections allow for efficient and effective assembly of the illuminating emblem, thus minimizing assembly time and materials while still achieving the desired uniform illumination of the illuminating emblem. Some illuminating emblem device embodiments are self-powered (e.g., include a battery) or do not require power (e.g., illuminating emblem devices that include self-illuminating or fluorescent paints and/or fillers).

Methods of assembly of some of the illuminating emblem device embodiments are also described herein for example purposes such that other assembly methods for achieving any of the embodiments disclosed herein are within the scope of this disclosure. The illuminating emblem device described herein can be coupled to any number of a variety of devices, such as vehicles (e.g., recreational vehicles, boats, motorcycles, jet skis, scooters, etc.), products, appliances (e.g., refrigerators, stoves, washing machines, etc.), and/or the like without departing from the scope of this disclosure.

FIG. 1 illustrates a cross-section view of an embodiment of an illuminating emblem device 100 having a housing 102 that includes a face plate or front housing part 106 coupled to a backing or back housing part 108. An inner cavity 110 can be contained between the front and back housing parts 106, 108. The illuminating emblem device 100 can further include a light assembly 111 that is configured to emit light. At least a part of the front housing part 106 can be made out of one or more materials that allow light emitted from the light assembly to pass through the front housing part 106. The front housing part 106 can be formed of a rigid or semi-rigid formable sheet into a 3D shape. The inner cavity 110 can at least partially be filled with a filler 112, such as a light diffusing filler. The filler 112 can be positioned adjacent, including surrounding, the light assembly 111. In some embodiments, the filler 112 can assist with positioning the light assembly 111 within the inner cavity 110.

For example, the filler 112 can be made out of any number of materials and can provide a number of features, including those discussed herein. For example, the filler 112 can be made out of a plastic, a urethane, a silicone, an epoxy, a one part curing resin, and a two part curing resin. The filler 112 can include a light diffusing urethane resin, which can be poured into the inner cavity 110 and allowed to solidify. The filler 112 can be delivered and allowed to harden or cure in the interior cavity in one or more. Such layering can assist with either placing the light source or light assembly at a correct position and orientation within the inner cavity 110 to achieve various visual effects. The filler 112 can be clear when cured or can include a pigment (e.g., white, red, black, etc.).

In some embodiments, a light diffusing filler 112a can be poured into the front housing part 106 and the light assembly 111 can be placed behind this light diffusing layer 112a. A light blocking filler 112b can then be backfilled to cover a back side of the light assembly 111 thereby assisting light emitted from the light assembly 111 to be directed through the front housing part 106. For example, the light assembly 111 can include a light panel (e.g., a white backlit module panel) that can be placed on a first layer surface of a light diffusing urethane resin (e.g., light diffusing filler 112a layer) for assisting with uniformly emitting light through the front housing part 106. The light blocking filler 112b layer or other features can be backfilled or positioned behind the light assembly 111 to encapsulate the light assembly 111 and give the formed 3D front housing part 106 a rigid or semi flexible strength. An adhesive (e.g., adhesive coating) 114 can be applied at the time back filler is added or after the back filler is cured/solidifies. The adhesive can assist with coupling the illuminating emblem device to a surface (e.g., vehicle, device, etc.).

The light assembly 111 can include any number of a variety of lighting features that can assist with emitting light through the front housing part 106. Furthermore, the light assembly 111 can emit light substantially uniform across the front housing part 106. This can improve the clarity of features associated with the illuminating emblem device 111, such as under dark or low-light conditions, as well as improve the appearance and aesthetics of the illuminating emblem device 100. The light assembly 111 and front housing part 106 can include any number of features, such as those described herein.

Figure 2:
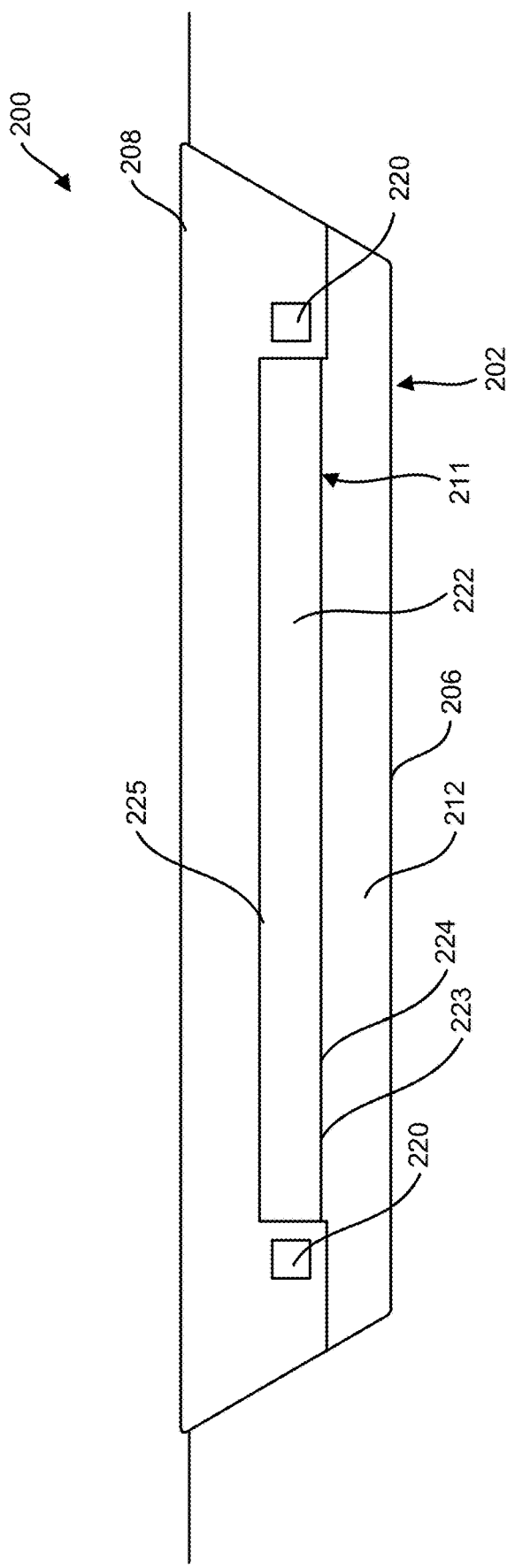
FIG. 2 illustrates a side cross section view of another embodiment of an illuminating emblem assembly of showing a part of the light assembly.

FIG. 2 illustrates a cross-section view of a part of an embodiment of an illuminating emblem device 200, which includes a light assembly 211 that has at least one light source 220 coupled to a light panel 222. As shown in FIG. 2, the light assembly 211 can be contained between the front housing part 206 and back housing part 208 of the housing 202. As discussed above, the light assembly 211 can be at least partially embedded in a filler 212, such as a light diffusing filler and/or any of the fillers discussed herein. The light source 220 can include one or more of a variety of light sources, such as a light emitting diode (LED), a pinpoint LED lamp, an incandescent light bulb, and a flexible light source.

When the light source 220 is illuminated, the light emitted from the light source 220 can be deflected off of the light panel 222 such that the light that is ultimately radiated through the front housing part 206 is (or at least appears to be) uniform across a part of the front housing part 206 that allows light to be transmitted therethrough. For example, in some embodiments, the front housing part 206 can include a first part that is made out of a translucent or transparent material that allows light to travel therethrough and a second part that is made out of an opaque material that prevents light from traveling therethrough. The light source 220 can be positioned relative to the light panel 222 in a variety of configurations, such as positioned along one or more sides of the light panel 222, as shown in FIG. 2.

Some configurations and embodiments of the light source 220 relative to the light panel 222 can include an array of light sources 220 (e.g., LED's) placed along a back side (e.g., side facing the back housing part 208) of the light panel 222 and features in or on the light panel 222 can be designed to distribute light emitted from the light sources 220 to areas on the front housing part 206 to create a significantly uniform or "shaped" light distribution. The light sources 220 can be placed along one or more sides or edges of the light panel 222 thereby allowing the light emitted from the light sources 220 to be emitted through the front housing part 106. For example, light emitted from the light sources 220 can reflect off a one or more surfaces of the light panel 222 (e.g., a surface facing the inside of the light panel 222 and/or a surface facing the outside of the light panel 222) in a direction that is affected by a refractive index of the light panel 222. The angle of incidence of the light on the light panel 222 can be referred to as a Brewster's angle. For example, light striking a surface facing the inside of the light panel 222 at an angle greater than the Brewster's angle can be reflected back into the light panel 222 and can then be used by the light panel 222 to reflect out at an angle that is more useful (e.g., directed out the front housing part 206). In some embodiments, a row of light sources 220 can be placed on one or more edges or even placed in specific areas of an edge or edges of the light panel 222 in order to achieve a specific light design objective. In some embodiments, light emitted from one or more light sources 220 can be reflected off shaped reflectors to create a desired lighting effect. In some embodiments, the light panel 222 can include one or more holes or cavities that are sized and shaped to position at least one light source therewithin, which can intensify and brighten light emitted from these light sources.

In some embodiments, the light panel 222 can include one or more surface features 224 that can direct light, such as toward the front housing part 206. For example, the surface features 224 can be on a front surface 223 (e.g., facing the front housing part 206) or back surface 225 (e.g., facing the back housing part 208) of the light panel 222 and can disperse light emitted from the light assembly 211 to illuminate specific areas of the front hosing part 206. Such surface features 224 can be printed, machined, cast stamped, and/or added to the panel. The surface features 224 can include any number of shapes and configurations. For example, the surface features 224 can each have a small circular shape and can be placed in such a way to either achieve a largely uniform light field or selectively direct light from the light panel 222 (e.g., intensify light in some directions and reduce light intensity in other directions). The surface features 224 can include inkjet or screen printed patterns, machined patterns, molded patterns, small lenses, and/or areas with obscured surfaces such as frosted or semi-transparent finishes and/or masks. The surface features 224 patterns can include any of a variety of patterns, such as grids, meshes, and/or other shapes. The light panel 222 can have a variety of shapes and sizes, including having one or more individual segments that are shaped to define a desired light output. Such segments may or may not be mechanically linked as well as electrically linked.

In some implementations, the surface features 224 can be fabricated by printing the pattern on the light panel 222 using a multiplicity of printing techniques, such as silk screening, mask and spray painting, thermal coining, hot stamp applied thermal inks or foils, pressure sensitive preprinted films, and the like. Additionally or alternatively, the surface features 224 can be machined or cast into the light panel 222. The surface features 224 and/or light panel 222 can include acrylic plastics, polycarbonates, styrene, or other materials that can be shaped and/or cast. The surface features 224 can include material that either reflects, absorbs, or diffuses light. In some embodiments, one or more light diffusing layers can be included further give the appearance of uniform light using diffusion. For example, the light panel 222 can include a substrate with high internal reflectivity that can be overlaid with an opaque material cut into a specific pattern that is overlaid with a colored transparent or semi-transparent material, which can filter patterns of light transmission created.

In some embodiments, one or more edges of the light panel 222 can include a light reflective material that can redirect lost light to the front housing part 206. In some embodiments, the light panel 222 can include a light enhancement film with one or more facets and/or other shapes to redirect light that was not released at a useful angle to one that is more useful (e.g., towards the front housing part 206). In some embodiments, the light diffusing filler 212 can include a clear material having titanium dioxide, calcium carbonate, and/or other light diffusing color pigments or particles suspended or coated on the surface of the light diffusing filler 212. In some embodiments, small glass spheres can be included in the light diffusing filler to create uniform foam having light diffusing properties without tinting the light diffusing filler 212. Alternatively or in addition, the light diffusing filler 212 can include a clear plastic sheet with micro-machined grooves or features that disrupt and scatter the light.

Figure 3F:
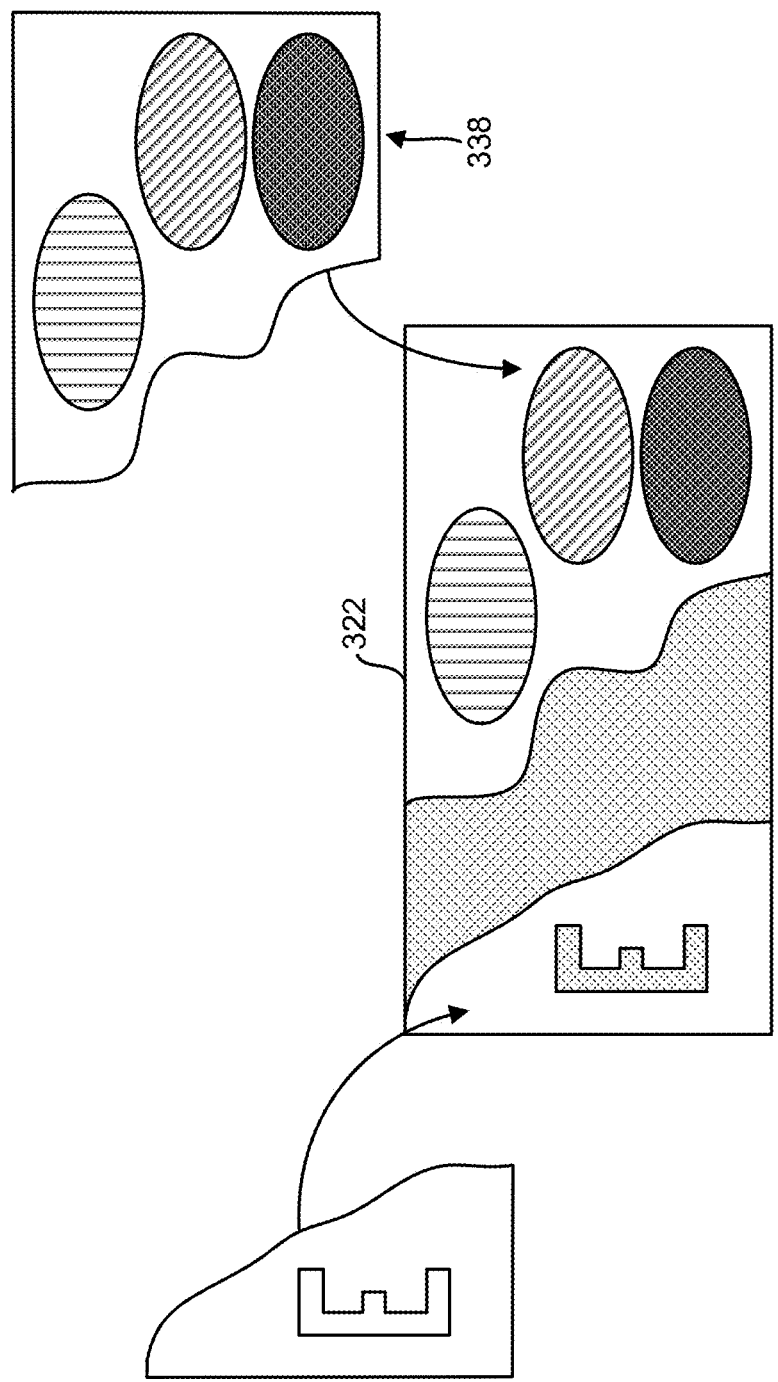
FIG. 3F illustrates various light panel features, such as masks, that can be included on the light panel of the light assembly of FIG. 3A.

FIGS. 3A-3F illustrate another embodiment of the illuminating emblem device 300 having a light panel 322 coupled to one or more adapters 330. Each adapter 330 can be configured to couple a light source 320 to the light panel 322, as well as assist with positioning the light panel 322 relative to a circuit board (or PCB) 335 upon which the light panel 322 can be coupled to. When illuminated, the light source 320 can direct light onto the light panel 322. The light panel 322 can assist with distributing the light evenly and/or preferentially along the front housing part of the illuminating emblem 300. FIG. 3C shows, for example, the adapter 330 coupled to the light panel 322, the light source 320 coupled to the adapter 330, and the adapter 330 coupled to the circuit board 335. The light panel 322 can include a diffusion film on one or both sides that can assist with diffusing light emitted from the light source 320. The adapter 330 can include a locator pin 332 that can assist with positioning the light panel relative to the circuit board. FIG. 3D illustrates example, retaining features 333 (e.g., opposing clamp arms) that are configured to couple the light source 320 to the adapter 330. The adapter 330 can also include light panel retention features 334 that assist with coupling the light panel 322 to the adapter 330. The adapter 330 can include any number of features (e.g., coated to increase reflectivity and reduce light loss) and provide a number of functions, such as allowing for tuning of the illumination and/or provide optics for light modification. In some embodiments, for example, one or more adapters 330 can include reflective properties that allow at least a part of the adapter 330 to reflect light emitted from the light source, such as in a focused, diffused or shaped manor. For example, such adapters 330 having reflectors can be shaped in a parabolic, Gregorian, off axis, planar, hyperbola, or elliptical shape. For example, the adapter 330 can be made out of one or more materials that can provide Lambertian or other light scattering effects, as well as specular reflection. In some embodiments, the adapter can include one or more shapes that assists with shaping and/or directing light, such as a prism, dimple, pyramid, half sphere, etc. Such adapter shapes can be uniform, such shapes found in light management films, or can be random shapes having varying sizes, spacing, and shaping (e.g., a textured surface). Some embodiments of the adapter 330 can thus focus, create a lighting effect, or redirect light emitted from the light source 320, such as to prevent light loss, (e.g., from areas close to the edge of the light panel 322).

FIG. 3E illustrates various printed surface features 324 of the light panel 322 associated with the light assembly 311. The surface features 324, for example, can be printed on a surface of the light panel 322 and can be varied (e.g., size, shape, color, pitch, diameter, pattern density, etc.) to allow different amounts and/or effects of light to pass through. Some embodiments of the surface features 324 can include printed or extruded dots. For example, the surface features 324 can be made from materials with a similar refractive index as the light panel 322, which can contain pigments or other materials that change the nature of the light by reflecting, absorbing or dispersing the light in some way. The surface features 324 can also be made from a resin or coating (e.g., having a significantly different refractive index from the light panel 322). As such, for example, the light can be bent, refracted or allowed to transmit in a variety of ways. In some embodiments, for example, the surface features 324 can be approximately 0.001 inch thick and approximately 1 millimeter in diameter. In some embodiments, one or more white reflector panels 339 (as shown in FIG. 3C) can also be placed adjacent or along one or more sides of the light panel 322. The white reflector panels 339 can reflect the light exiting the light panel 322 back into the lamp panel 322, thereby allowing the light to be reflected in a different direction.

FIG. 3F illustrates various features that can be coupled to a light panel 322, such as one or more masks 338. For example, a mask 338 can be applied to one or more surface areas of the light panel 322 to modify the light or illumination provided by the device. Some masks can include colored patterns that can provide, for example, colored and uniform emitted light through the front housing part. In addition, some masks can be opaque thereby preventing light to pass through. Some embodiments of the masks having a colored appearance can be made from one or more pigments or dyes applied to a surface of the lamp panel using any number of techniques, such as printing, sublimation, ink jetting, foil transfer, painting, etc. Some colored masks can be made from a plastic film that includes light filtering pigments or dyes therewithin. A colored mask can also include a clear base material with a coat of light altering pigments or dyes applied thereon. Some embodiments of the mask can include a transparent, semi-transparent or translucent film that has one or more areas of colorant, pigment or dye applied to the surface.

In some embodiments, one or more surfaces of the adaptor 330 can include at least one feature that can focus, diffuse, and/or otherwise modify the light emitted from the light source 320. These adaptor surface features can include one or more lenses, surface finishes, various patterns, and/or masks or colored elements. Such adaptor surface features can direct, encourage, and/or prohibit light propagation.

In some embodiments, the front housing part can include a vacuum deposition material that allows light to transmit therethrough thereby illuminating the front housing part when the light assembly is emitting light and creates a metal, metallic, or chrome appearance to the front housing part when the light assembly is not emitting light. In some embodiments, a front side of the back housing part can include one or more of a reflective film, a reflective tape, a reflective paint, a self-illuminating (e.g., fluorescent) paint, and a light diffusing surface. Furthermore, in some embodiments, a first part of the front housing part can allow light to pass therethrough and a second part of the front housing part can prevent light from passing therethrough.

Figure 4:
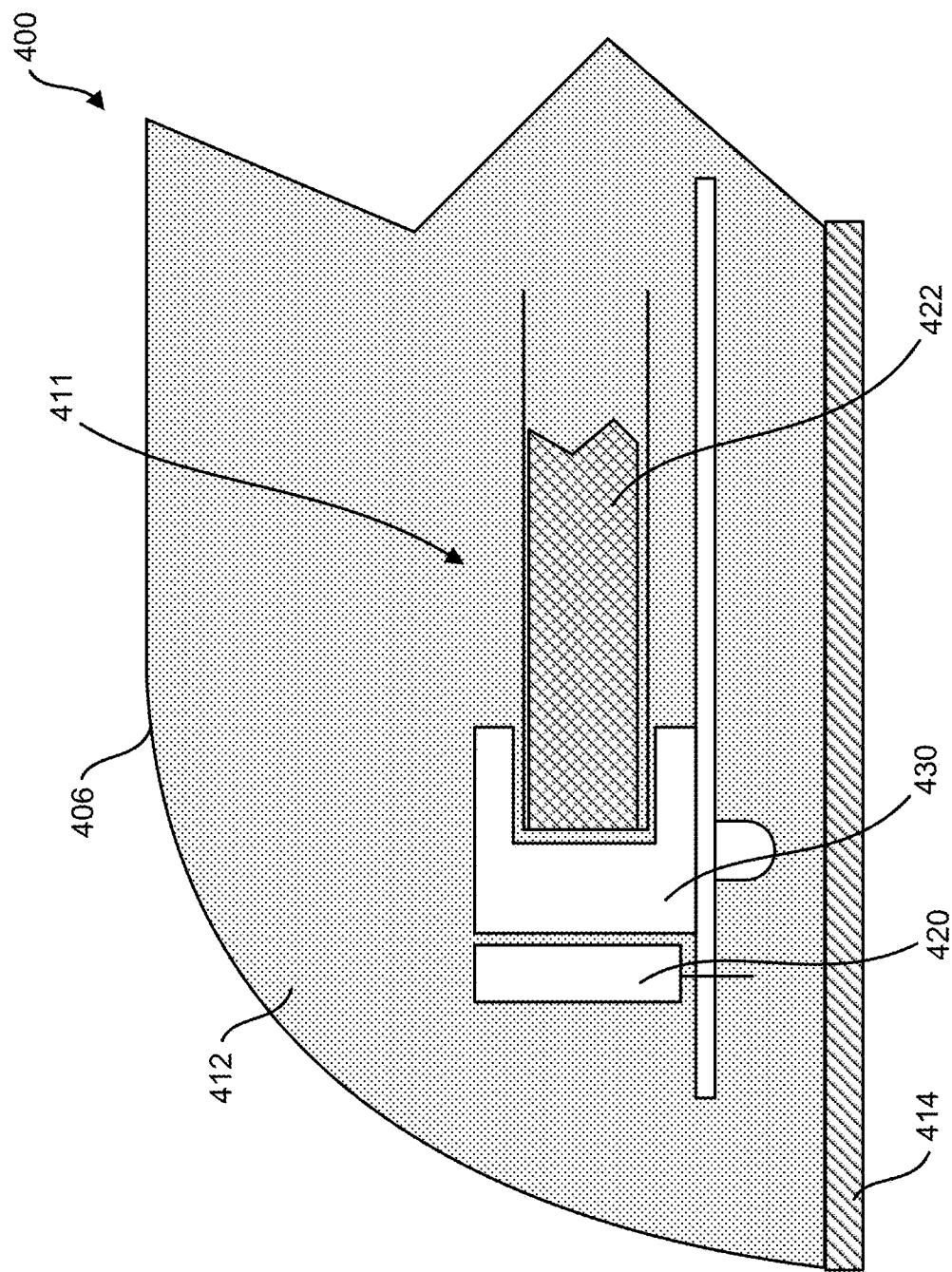
FIG. 4 illustrates a side view of another embodiment of the illuminating emblem assembly, which includes a thermoformed face plate and a light diffusing filler material.

FIG. 4 illustrates another embodiment of the illuminating emblem device 400, which includes a thermoformed front housing part 406 that is filled with a light diffusing filler 412, such as any of the light diffusing filler 412 described herein. The illuminating emblem device 400 shown in FIG. 4 can include a light assembly 411 that includes a light source 420 coupled to a light panel 422 via an adapter 430 and can be contained within the light diffusing filler 412. As shown in FIG. 4, an adhesive coating or layer 414 can be positioned along a back side of the illuminating emblem device 400 for assisting with coupling the device 400 to a surface. The adhesive 414 can be pressure sensitive and/or double sided or could be heat activated.

Any of the illuminating emblem devices described herein can include a variety of electrical connections and power assemblies that assist with providing power to the light assembly. Various embodiments of such electrical connections and power assemblies are illustrated and described herein. Other embodiments are also within the scope of this disclosure.

FIG. 5A illustrates another embodiment of the illuminating emblem device 500 having distal ends of electrical leads 550 encapsulated in the light diffusing filler 512 that also encapsulates the light assembly 511. The distal ends of the leads can be coupled (e.g., soldered) to the circuit board 535, which can be electrically connected to the light source 520. The embodiment of the illuminating emblem device 500 can include an electrical connection where there are no intermediary connections, connectors or other points of failure between the electrical leads 550 and the light assembly 511.

FIG. 5B illustrates another embodiment of the illuminating emblem device 600 including electrical leads 650 coupled to subsurface conductive pads 652. The subsurface conductive pads 652 can be connected (e.g., soldered) to the circuit board 635 and the distal ends of the electrical leads 650 can be coupled to the subsurface conductive pads 652 (e.g., after backfilling with light diffusing filler 612), such as using mechanical features (e.g., screws). The subsurface conductive pads 652 can prevent interference with a backfilling operation. The electrical leads 650 can include non-conductive sleeves that prevent shorting.

FIG. 5C illustrates another embodiment of the illuminating emblem device 700 having electrical leads 750 coupled to the circuit board 735 and are exposed through encapsulation by the light diffusing filler 712. The additional potting or light diffusing filler 512 in this embodiment can protect sensitive electronics from water ingress, thereby making the device 700 water resistant or water proof.

FIG. 5D illustrates another embodiment of the illuminating emblem device 800 having conductive pins 854 extending from the light assembly 811 that are configured to couple to a socket assembly 856. The socket assembly 856 can be coupled to electrical leads 850 that extend to a power source. For example, this embodiment of the illuminating emblem device 800 can allow a user to easily connect and disconnect the power source to the illuminating emblem device 800.

Figure 6:
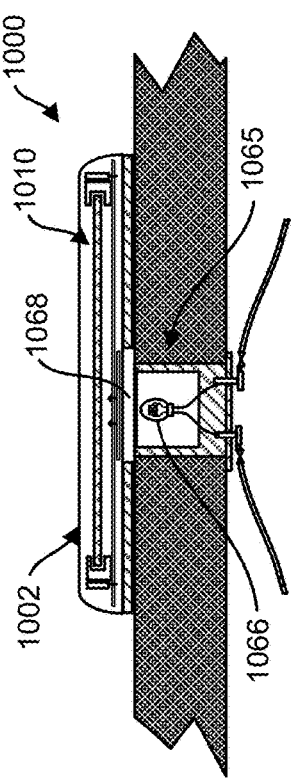
FIG. 6 illustrates a side cross-section view of another embodiment of the illuminating emblem assembly including an inductive connection.

FIG. 6 illustrates another embodiment of the illuminating emblem device 900 coupled to a surface 901 including an inductive connection with encapsulated coils 960 extending between the light assembly 911 and electrical leads 950. For example, at least two antennae 952 and an inductance are used to transmit electricity across a gap of a non-conducting material, such as air, adhesive, fiberglass materials, plastics. Depending upon the tuning of the antennae 952 and the electronics, the size of the gap between the sending antenna and receiving antenna of the inductive circuit can transmit more electrical power than needed to power the light source 920, which can have a relatively low electrical consumption. For example, this embodiment can provide an advantage of having a submerged light assembly 911 and power source or circuitry so the device 900 can be efficiently manufactured and coupled to, for example, the surface 901 of a vehicle or device. The inductive power circuitry can offer an additional advantage in that both the sender and receiver electronics can be potted or molded in a way that make both substantially waterproof. For example, a hole does not need to be opened up in the sidewall of a boat, RV or other product, but rather a completely sealed wall can be built on the sender side to house the sender. As such, the sender and receiver can be completely hidden and a completely waterproof illuminating emblem device 900 can result.

Figure 7:
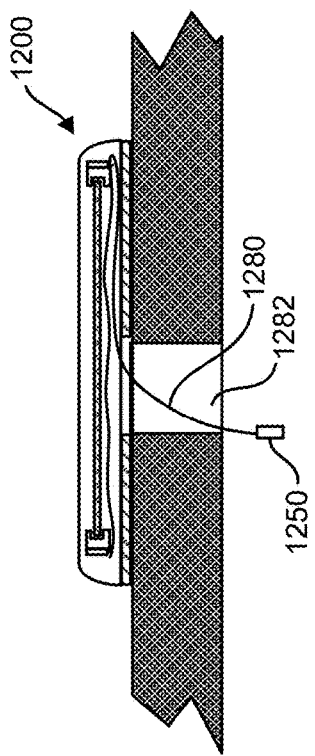
FIG. 7 illustrates a side cross-section view of another embodiment of the illuminating emblem assembly including a photovoltaic cell encapsulated with an external light source.

FIG. 7 illustrates another embodiment of the illuminating emblem device 1000 including a photovoltaic cell 1065 encapsulated with an external light source 1066. The photovoltaic cell 1065 along with a battery 1068 can be embedded within the housing 1002 or inner cavity 1010 of the front housing part 1006 in a way that allows charging of the battery 1068 in the daytime for use at night. A controlling circuit can be provided that switches between charging mode in daytime use, self-contained powered mode at night, and an additional powered mode when the unit can be powered by the battery or normal electrical system of the unit it is attached to. The controlling circuit can be automated and/or controlled by a user. This can offer the advantage of having an illuminating emblem device 1000 that lights up at night without draining the battery 1068.

In some embodiments, the solar cell and battery can be embedded in the housing 1002 thereby making the illuminating emblem device 1000 completely self-contained without any external wiring or holes, such as in the back housing part 1006. Some embodiments can include the following: a self-contained battery with charging coming from an external solar cell; a self-contained battery that is charged by a vehicle power supply when energized; an illuminating emblem device 1000 that is powered by an additional external module that contains a battery and a charger energized by the vehicle electrical system when the vehicle is operating. Such embodiments can reduce or eliminate the need for external power, such as when the emblem is illuminated.

Figure 8:
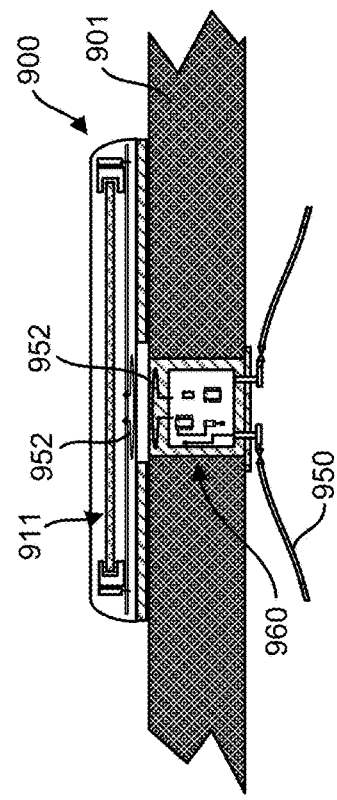
FIG. 8 illustrates a side cross-section view of another embodiment of the illuminating emblem assembly including at least one electrical contact exposed through the fill material and coated with a self-healing polymer.

FIG. 8 illustrates another embodiment of the illuminating emblem device 1100 including at least one electrical contact 1170 exposed through the light diffusing filler 1112 and coated with a self-healing polymer 1172. For example, the self-healing polymer 1172 can include a soft silicone or urethane that allows a conductor to penetrate and make contact with a target underneath. For example, the self healing polymer can flow around a conductor thereby making it water resistant or waterproof.

The self-healing polymer 1172 can allow a connection to be made between the electrical contacts 1170 and the light assembly 1111 under a surface of the self-healing polymer 1172 without further potting. This can allow the self-healing polymer 1172 to be submerged under a surface of adhesive 1114. In this way the electrical connections and self-healing polymer 1172 do not interfere with the filling or potting process using the light diffusing filler 1112. Other electrical connections and connectors (e.g. needle-like connections 1174) can be included in the device 1100 (e.g., after the electrical contact 1170 connection is made) using a method that minimally disturbs the adhesive 1114 and self-healing polymer 1172, as well as prevent water ingress into the device 1100.

Figure 9:
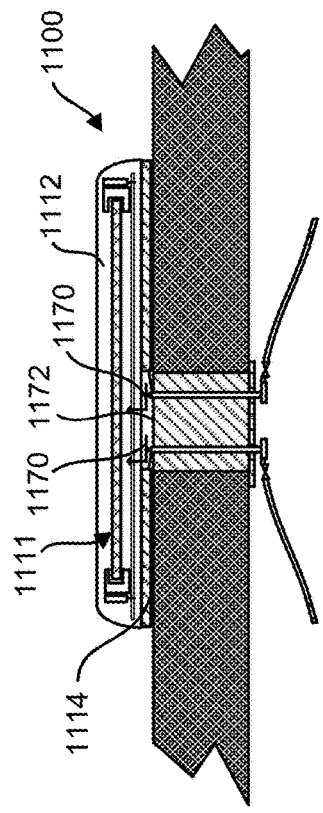
FIG. 9 illustrates a side cross-section view of another embodiment of the illuminating emblem assembly including at least a part of a flexible circuit board encapsulated with at least one end of the circuit board exposed and not encapsulated.

FIG. 9 illustrates another embodiment of the illuminating emblem device 1200 including a flexible circuit board 1280 encapsulated with a proximal end exposed through an encapsulating material 1282. The addition of the flexible circuit board 1280 can eliminate the need to connect wires or electrical leads 1250 to an embedded circuit board but rather to extend the flexible circuit board 1280 out through the back of the illuminating emblem device 1200. For example, this can make manufacturing more efficient and cost effective by combining the steps of making a circuit of lights and adding wires to that circuit.

Figure 10:
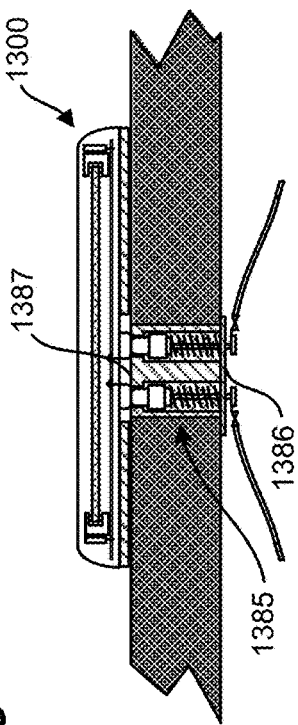
FIG. 10 illustrates a side cross-section view of another embodiment of the illuminating emblem assembly including an externally mounted spring driven contact pin that is exposed to an electrical contact pad.

FIG. 10 illustrates another embodiment of the illuminating emblem device 1300 including an externally mounted spring driven contact pin 1385 that is exposed to an electrical contact pad 1387. The spring of the spring driven contact pin can assist with maintaining contact between the pin and contact pad 1386. For example, this illuminating emblem device 1300 can be free from wires, which can make mounting the device 1300 easier and more efficient.

The illuminating emblem can include any number of a variety of lighting assemblies, including light sources, for assisting with illuminating the emblem. Various embodiments of such lighting assemblies are illustrated and described herein. Other embodiments are also within the scope of this disclosure.

FIG. 11 illustrates another embodiment of the illuminating emblem device 1400 including a light assembly 1411 having at least one fiber optic cable 1488. The fiber optic cable 1488 can be exposed to filler or encapsulating material 1482 and illuminated by an external light source 1489. The external light source 1489 can be positioned outside of the inner cavity 1410 of the front housing part 1406, such as shown in FIG. 11. This embodiment can alternatively, or in addition, including an internal light source.

FIG. 12 illustrates another embodiment of the illuminating emblem device 1500 including a light assembly 1511 having a light pipe 1590, which can be exposed to filler or encapsulating material and/or an external light source 1589. The light pipe 1590 can also provide support for other parts of the light assembly 1511, such as the light panel 1522. The light pipe 1590 can move the electronics and light generation out of the housing 1502 and to a sender unit. The sender unit (light generator) and receiver unit (illuminating emblem) can work together in such a way as to uniformly distribute light emitted from the light pipe 1590.

The receiving unit (e.g., illuminating emblem device 1500) can include a light distribution system that uses mirrors, lenses, and/or the like to redirect the light throughout the illuminating emblem. Such an embodiment of the device 1500 can be void of electronics and be water resistant or water proof. In some embodiments, the light pipe 1590 can include internal reflectivity, be either hollow or solid, and/or transmit non-image light along its length. The emissive end of the light pipe 1590 can have a shape designed to specifically disperse the light in a preferential manner. Such light pipes 1590 can also interface with other light pipes or other light conductive structures to distribute the light in preferential patterns.

FIG. 13 illustrates another embodiment of the illuminating emblem device 1600 including an electrical storage device 1692, such as a battery. Such electrical storage device 1692 can be positioned within the housing 1602 or inner cavity 1610 of the illuminating emblem device 1600. In some embodiments, the electrical storage device 1692 can include a photovoltaic cell and can be encapsulated for charging by ambient light. Some implementations can include light detection such that the one or more light sources of the light assembly 1611 can be turned on once low-light is detected. A timer can be implemented in the illuminating emblem device 1600 that can be configured to turn off the light after a predetermined or set time.

For example, some embodiments of the illuminated emblem device can illuminate without conducting electricity to the housing or within the inner cavity of the illuminating emblem device. Such embodiments of the illuminating emblem device can be resistant from water and able to be exposed to various fumes and/or vapors without interfering with its functioning. Encapsulation of the major light conducting components, minimal exposure of the conducting elements, and a seal provided by the pressure sensitive adhesive tape/foam laminate used for attachment can also assist with such water and environment proofing.

FIGS. 14A-14B illustrate another embodiment of the illuminating emblem device 1700 including a coupling feature 1795 that includes a bulkhead connector 1796. Encapsulation or light diffusing filler can bond to and backfill a part of the coupling feature 1795. In some methods of manufacturing, the illuminating emblem device 1700 can be assembled and encapsulated at the same time. The emblem device 1700 can be assembled onto a backing having the bulkhead connector 1796 under controlled conditions that can create an improved waterproof connection. It is well known that directing wires through holes can create rough surfaces that the wires can rub against. These rough surfaces can abrade the wires over time and destroy the conductive capability of the wires. As such, the bulkhead connection 1796 can create a protective conduit through which the electrical leads 1750 can be protected.

In some methods of manufacturing, the illuminating emblem device shown in FIGS. 14A-14B can include a coupling feature 1795 that is not attached at the time of encapsulation of the components (e.g., light assembly 1711). For example, the encapsulated components can be attached to the coupling feature 1795 using two sided adhesive tape, adhesive 1714, mechanical means such as fasteners or the like. Conducting leads 1750 can extend from the light assembly 1711 and can be sealed using a variety of compounds such as resins, sealers, adhesives, etc. For example, the illuminating emblem device 1700 can be attached to a structure using a single fastener (e.g., nut 1740) or a plurality of fasteners. Additionally, the bulkhead device 1795 can be shaped and decorated in a way that is visible from the front side to be an aesthetic addition to the lit emblem much like a trim piece.

FIGS. 15A-15B illustrate a downlight illuminating emblem device 1800 that can include one or more of the features described above, as well as a base or back housing part 1808 that is configured to block light being emitted from the light assembly 1811 in one or more directions. In some embodiments, the back housing part 1808 can be made out of a light blocking filler (e.g., light blocking acrylic). The illuminating emblem device 1800 can also include light diffusing filler 1812 that allows light to exit in one or more areas. The light source 1820 can include an LED panel or strip 1842 that extends along a back side of the front housing part 1806. The downlight illuminating emblem device 1800 can also include a light filter positioned adjacent the LED strip 1842.

Figure 16:
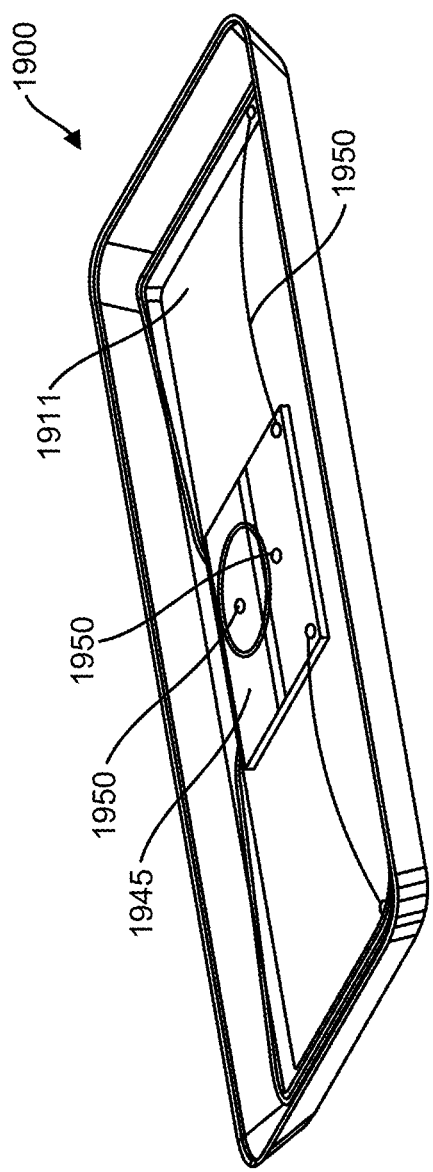
FIG. 16 illustrates a perspective view of another embodiment of the illuminating emblem assembly having a submerged copper circuit board.

FIG. 16 shows an illuminating emblem device 1900 having a submerged copper circuit board 1945 (e.g., one or more copper circuit board 1945 that are encapsulated in the light diffusing filler 1912). For example, electrical leads 1950 can extend between the light assembly 1911 and the copper circuit board 1945. In some embodiments, the copper circuit board 1945 can be adhered to the light assembly 1911 or submerged behind the light assembly 1911 during the backfill operation (e.g., after the light assembly 1911 has been at least partially encapsulated). Some manufacturing advantages can include the copper circuit board 1945 being backfilled without elements protruding through an adhesive 1914 along the back side of the illuminating emblem device 1900. Some methods of manufacturing, for example, can include one or more of the following steps: 1) connect and position the copper plate 1945 on the back of the light source; 2) backfill with light diffusing filler 1912, apply adhesive 1914, and allow light diffusing filler 1912 to cure; 3) cut the adhesive 1914 and down through the backfill to the copper circuit board 1945 and remove a backfill/adhesive plug; 4) connect electrical leads 1950 to the copper circuit board 1945; 5) backfill space where backfill and adhesive was removed.

FIGS. 17A-17B show an illuminating emblem device 2000 having a submerged bulkhead connector 2046 (e.g., a bulkhead connector that is at least partially encapsulated in the light diffusing filler 2012). In some embodiments, one or more pins 2200 can engage with or be coupled to the submerged bulkhead connector 2046 to provide a conductive pathway to one or ore more light sources. Some methods of manufacturing, for example, can include one or more of the following steps: 1) one or more light source connection wires can be connected to the pins 2200; 2) a bulkhead connector 2046 can be affixed to the back of the light source 2020 in such a way that it can be located at a later time and the connector can include a pocket that is laminated with tape (or similar material) to keep backfill from filling the connector area; 3) The light diffusing filler 2012 can be backfilled and adhesive laminated; 4) the location of the air pocket can be located and the adhesive 2014 can be cut and removed thereby opening the bulkhead connector 2046; 5) a connection between the light source 2020 and a power source can be made either by plugging, soldering or other method. The bulkhead connector 2046 can be molded in such a way to prevent ingress of water. This can prevent a well-known issue where the wires exiting the backfill can allow ingress of water down the outside of the wires from lack of bonding to the wire insulation or stress on the wires that open up channels for leakage.

Figure 18:
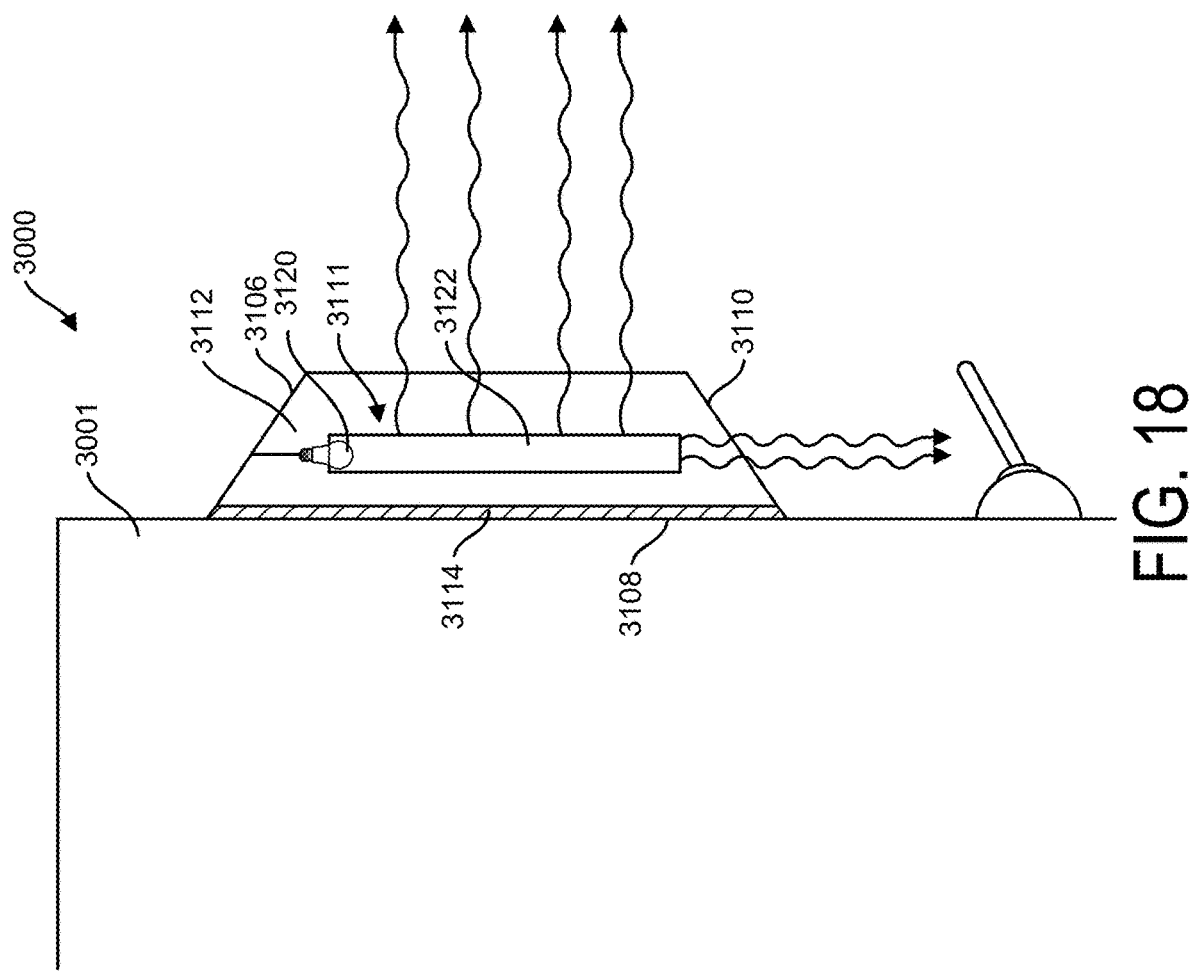
FIG. 18 illustrates a side view of another embodiment of an illuminating emblem assembly having a light assembly that emits light directed along or parallel to a plane along with a light panel of the light assembly extends along.

FIG. 18 illustrates a side view of another embodiment of an illuminating emblem assembly 3000 mounted to a surface 3001 (e.g., via an adhesive layer 3114 along a back housing part 3108) having a light assembly 3111 that emits light directed along or parallel to a plane along which a light panel 3122 of the light assembly 3111 extends along. This can allow light to be directed through a side surface 3110 (e.g., top side, bottom side, left or right side) of the front housing part 3106. Light can also be emitted at other angles through the front housing part 3106, such in a direction perpendicular to a front surface of the light panel 3122. As such, the illuminating emblem assembly 3000 can provide illumination of the features associated therewith (e.g., emblem features along the front housing panel 3106) as well as provide illumination of features, elements, etc. positioned adjacent to the illuminating emblem assembly 3000.

As shown in FIG. 18, the illuminating emblem assembly 3000 can include a light panel 3122 with a row of light sources 3120 (e.g., LED's) on a first side (e.g., top side) of the light panel 3122 and an opposing side (e.g., bottom side) of the light panel 3122 can be free from interference (e.g., no lights or light-blocking films) thereby allowing the light emitted from the row of light sources can be emitted from the opposing side and through a side surface (e.g., side surface 3110) of the front housing part 3106. Such light can also pass through a filler 3112 (e.g., light diffusing) and/or through a transparent chrome-like material. Various other embodiments and configurations are within the scope of this disclosure, such as including a first strip of LED's positioned along a bottom side of the light panel 3122 that projects light up into the light panel, as well as another strip of LED's back to back with the first strip that sends light in the opposite direction.

Figure 19C:
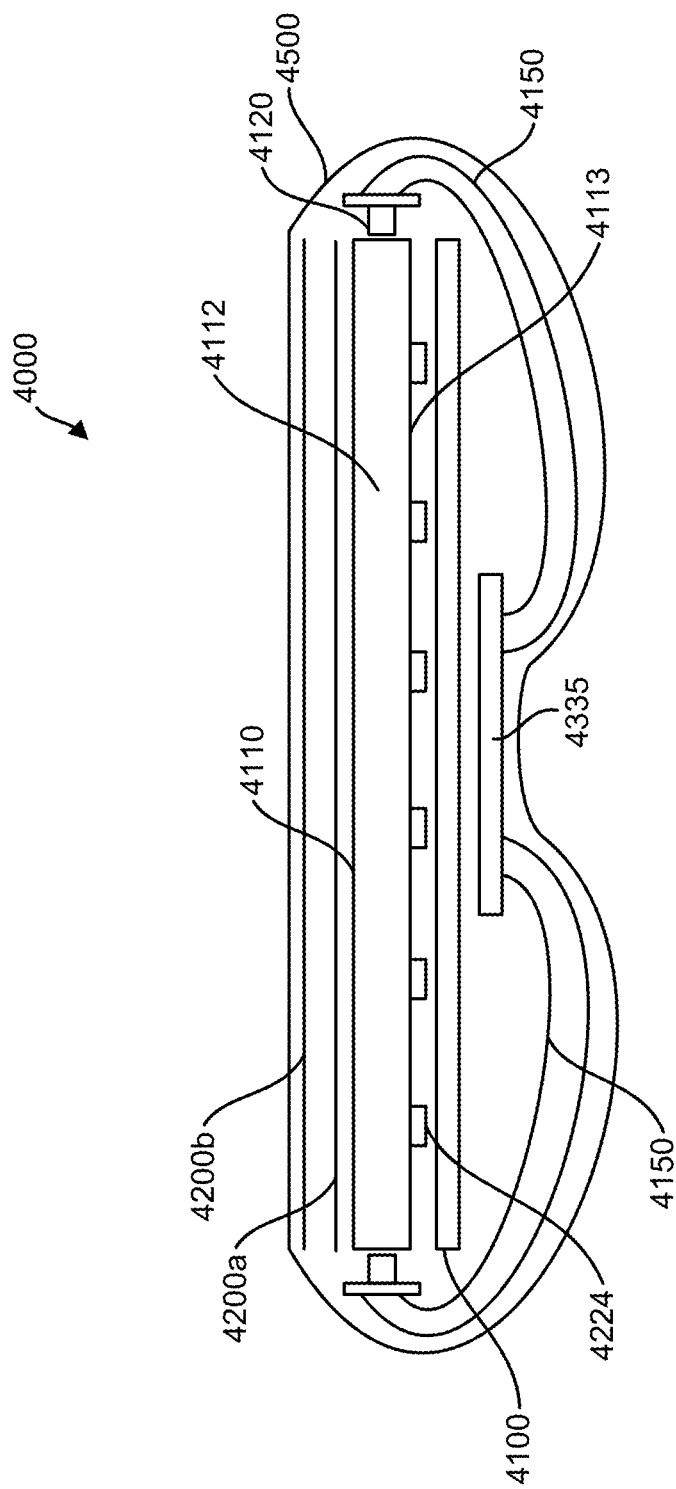
FIG. 19C illustrates a side view of the light assembly of FIG. 19A.
Figure 19D:
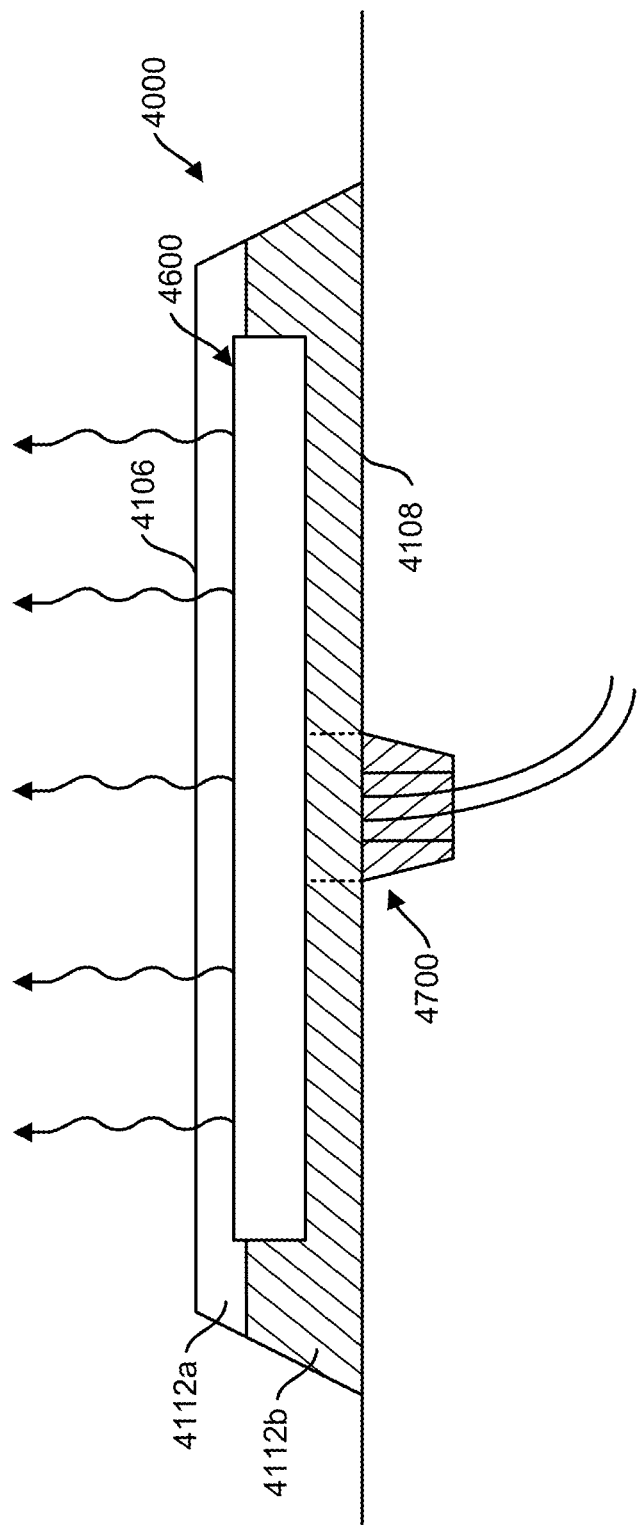
FIG. 19D illustrates a side view of the illuminating assembly including the light assembly of FIG. 19B.

FIGS. 19A-19D illustrate another embodiment of an illuminating emblem assembly 4000 having a light assembly 4600 that can be included in the illuminating emblem assembly 4000. The light assembly 4600 can include an acrylic panel 4112 with at least one light source 4120 (including a row or string of light sources) positioned along a side of the acrylic panel 4122, such as is shown in FIGS. 19A and 19B. For example, the light source 4120 can be taped or glued along the side of the acrylic panel 4122. Sides of the acrylic panel 4122 that do not include the light source 4120 can include a white vinyl material 4250 that reflects light into the acrylic panel 4122 to allow the light to eventually be directed out through the front housing part 4106. As shown in FIG. 19A, a back side 4113 of the acrylic panel 4122 can include surface features or light management features 4224 that can direct and effect the light emitted from the light source 4120, such as direct the light through the front housing part 4106. A white styrene material 4100 can be positioned over the back side 4113 having the surface features 4224 and circuit board 4335 can be coupled to a back side 4115 of the white styrene 4100, as shown in FIGS. 19B and 19C. An electrical lead 4150 can extend and be coupled between the light source 4120 and the circuit board 4335. As shown in FIG. 19C, one or more layers of a textured clear polycarbonate 4200a, 4200b can be positioned or adhered along a front side 4110 of the acrylic panel 4112, which can assist with concealing the components of the light assembly 4600 while not blocking light transmission. A clear vinyl material 4500 can be wrapped around the assembly, as shown in FIG. 19C, thereby preserving air layers within the light assembly 4600.

During assembly, the front housing part 4106 can be at least partly filled with a first layer of fill material 4112a, such as a light diffusing filler, and the light assembly 4600 can be positioned on top surface of the first layer of fill material 4112a. Once the first layer of fill material is cured, a second layer of fill material 4112b, such as a light-blocking filler, can be poured over the first layer of fill material 4112a and light assembly 4600, thereby covering a back side of the light assembly 4600. An adhesive can be added to the top of the backfill or back housing side 4108. A laser cutter or other device can be used to cut away some of the cured second layer of fill material 4112b to access the circuit board 4335 for mating an electric coupling 4700 thereto. The electric coupling can include a collar that secures electrical wires extending from the light assembly 4600.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. An emblem assembly, comprising:
   an emblem housing including a front emblem housing part coupled to a back emblem housing part and an inner cavity contained between the front emblem housing part and the back emblem housing part;
   a light assembly configured to emit light and positioned within the inner cavity;
   a light diffusing filler filling a first portion of the inner cavity, the first portion of the inner cavity extending between the front emblem housing part and a front side of the light assembly, the light diffusing filler configured to diffuse light emitted from the light assembly, at least a part of the front emblem housing part allowing the diffused light emitted from the light assembly to pass therethrough; and
   a light blocking filler filling a second portion of the inner cavity, the second portion of the inner cavity extending between the back emblem housing part and a back side of the light assembly, the light blocking filler configured to prevent the light emitted from the light assembly from passing through the light blocking filler.

2. The emblem assembly of claim 1, wherein the light assembly includes at least one light source coupled to a light panel, wherein the light panel is configured to deflect light emitted from the at least one light source towards the front emblem housing part and uniformly distribute the emitted light through the front emblem housing part.

3. The emblem assembly of claim 2, wherein the light source includes one or more of a light emitting diode (LED), a pinpoint LED lamp, an incandescent light bulb, and a flexible light source.

4. The emblem assembly of claim 2, wherein the light panel includes at least one surface feature, wherein each surface feature directs the deflected light towards the front emblem housing part.

5. The emblem assembly of claim 4, wherein the at least one surface feature includes one or more of a printed pattern, a machined pattern, a molded pattern, a lens, a frosted coating, and a semi-transparent coating.

6. The emblem assembly of claim 4, wherein the at least one surface feature includes a plurality of extrusions, wherein each of the plurality of extrusions includes one or more of a sphere shape, a half-sphere shape, and a tubular shape.

7. The emblem assembly of claim 1, further comprising a layer of clear vinyl material wrapped around the light assembly.

8. The emblem assembly of claim 1, wherein the light blocking filler comprises a light blocking acrylic material.

9. The emblem assembly of claim 1, wherein the front emblem housing part includes a vacuum deposition material that allows light to transmit therethrough thereby illuminating the front emblem housing part when the light assembly is emitting light and creates a metallic or chrome appearance to the front emblem housing part when the light assembly is not emitting light.

10. The emblem assembly of claim 1, wherein the front emblem housing part is three-dimensional.

11. The emblem assembly of claim 1, wherein a front side of the back emblem housing part includes one or more of a reflective film, a reflective tape, a reflective paint, a self-illuminating paint, and a light diffusing surface.

12. The emblem assembly of claim 1, wherein the light diffusing filler is made out of one or more of a plastic, a urethane, a silicone, an epoxy, a one part curing resin, and a two part curing resin.

13. The emblem assembly of claim 1, wherein a first part of the emblem housing part allows light to pass therethrough and a second part of the front emblem housing part prevents light from passing therethrough.

14. The emblem assembly of claim 1, wherein the back emblem housing part includes an adhesive positioned along a back side of the back emblem housing part for assisting with coupling the emblem assembly to a surface.

15. The emblem assembly of claim 1, further comprising an electrical lead extending from the light assembly and through the back emblem housing part for connecting the light assembly to a power source.

16. The emblem assembly of claim 1, wherein the light diffusing filler includes one or more of a colored pigment and a material that dissipates heat from the emblem assembly.

17. The emblem assembly of claim 1, wherein the light diffusing filler includes a fluorescent dye that becomes illuminated when light is emitted from the light assembly or from a secondary light source that is separate from the emblem assembly.

18. The emblem assembly of claim 1, wherein the light assembly includes an LED light pipe.

19. The emblem assembly of claim 1, wherein the light assembly includes an electroluminescent light panel or electroluminescent wire.

20. The emblem assembly of claim 1, further comprising a printed circuit board (PCB) and an adapter, the adapter coupling a part of the light assembly to the PCB, and wherein the adapter includes one or more of a lens, a light diffusing surface finish, a light directing pattern, and a light coloring element.

21. The emblem assembly of claim 1, wherein one or more of the light diffusing filler and the light blocking filler is made out of a two part urethane resin.

* * * * *

UNITED STATES PATENT AND TRADEMARK OFFICE
CERTIFICATE OF CORRECTION

| | |
|---|---|
| PATENT NO. | : 11,040,652 B2 |
| APPLICATION NO. | : 16/686025 |
| DATED | : June 22, 2021 |
| INVENTOR(S) | : Snyder et al. |

It is certified that error appears in the above-identified patent and that said Letters Patent is hereby corrected as shown below:

On the Title Page

In (71) Applicant: please delete "Encinitas, CA" and insert --Wichita, KS--

Signed and Sealed this
Twenty-third Day of August, 2022

Katherine Kelly Vidal
*Director of the United States Patent and Trademark Office*